United States Patent [19]

Nemoto et al.

[11] 4,288,194
[45] Sep. 8, 1981

[54] RAW MATERIAL DISTRIBUTING APPARATUS FOR A FURNACE

[75] Inventors: Susumu Nemoto, Kawasaki; Toshio Fujieda, Togoshi, both of Japan

[73] Assignee: Nippon Kokan Kabushiki Kaisha, Tokyo, Japan

[21] Appl. No.: 23,533

[22] Filed: Mar. 26, 1979

[30] Foreign Application Priority Data

Apr. 4, 1978 [JP] Japan .................................. 53-38811

[51] Int. Cl.³ .............................................. F27B 1/20
[52] U.S. Cl. ...................................... 414/586; 277/3; 432/235
[58] Field of Search .............................. 414/201–206, 414/586, 587; 277/3; 432/235, 242, 244

[56] References Cited

U.S. PATENT DOCUMENTS

| | | | |
|---|---|---|---|
| 2,573,492 | 10/1951 | Richardson | 414/586 |
| 3,273,899 | 9/1966 | Warnery | 277/3 |
| 3,677,879 | 7/1972 | D'Andrea | 308/DIG. 8 |
| 3,724,689 | 4/1973 | Sugawara et al. | 414/205 |

*Primary Examiner*—Robert G. Sheridan
*Attorney, Agent, or Firm*—Moonray Kojima

[57] ABSTRACT

An apparatus for distributing charged raw material into a furnace, wherein an armer rod having a distributing plate for the charged material is arranged on bearings to be slidable toward the furnace, and wherein a novel dust sealing mechanism and a cooling device are provided to reduce in size or to omit conventional accompanying facilities so that a compact distributing apparatus is realized.

8 Claims, 3 Drawing Figures

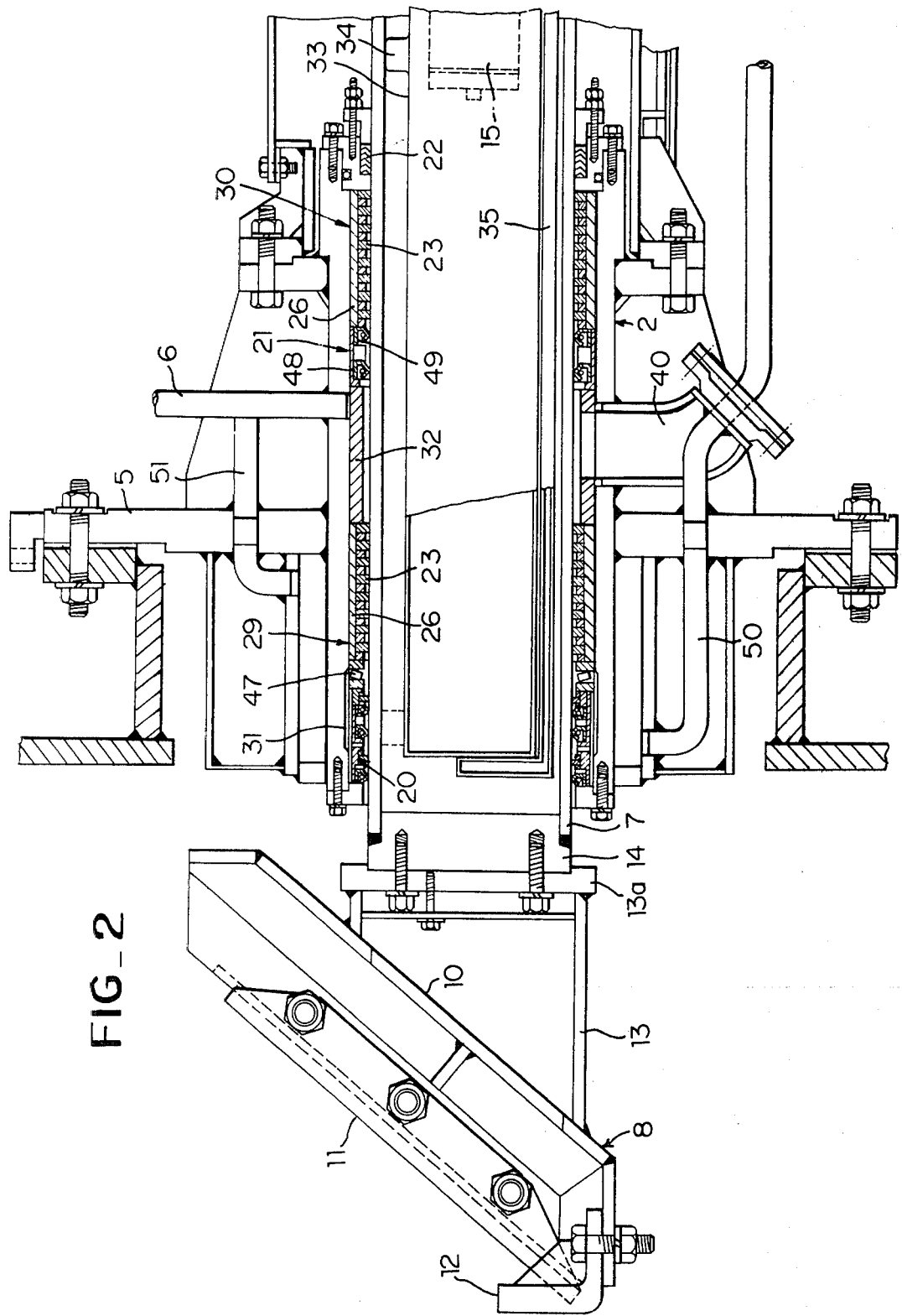
FIG_2

FIG_3
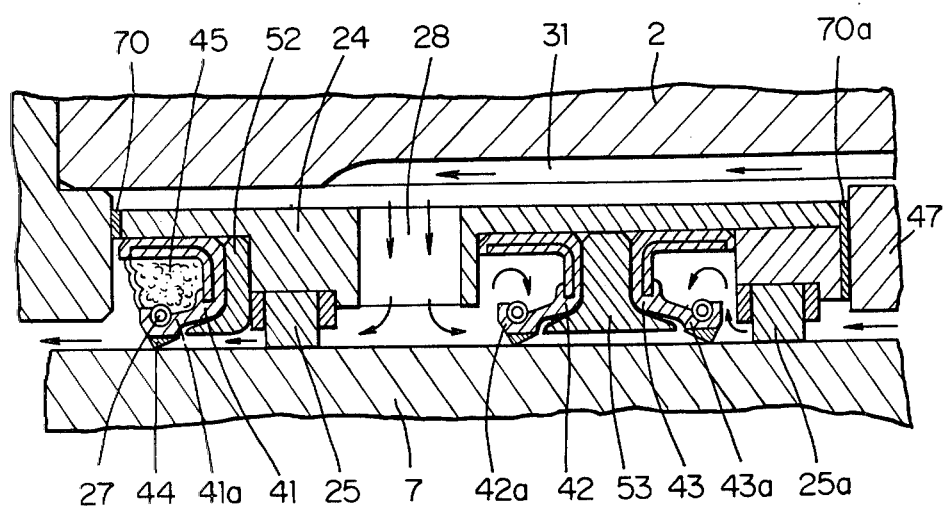

RAW MATERIAL DISTRIBUTING APPARATUS FOR A FURNACE

BACKGROUND AND SUMMARY OF THE INVENTION

In the prior art, the bell type apparatus has been used to charge raw materials, such as ore, coke, lime, etc, into a furnace. This type of apparatus comprised, in order, a conical small bell and a large bell on an axial line of the furnace. These conical bells are vertically movable to charge raw materials into the furnace. However, when raw materials are charged into the furnace using this arrangement, the charged material tends to accumulate along the inner wall of the furnace and make a depression in the center thereof, thus resulting in non-uniform distribution of raw materials.

In view of the foregoing, various means have been suggested heretofore to resolve such problem and obtain more uniform distribution of the raw materials in the furnace. One example is a truck or rod having a distributing plate at its front end disposed to be movable toward the furnace to cause the plate to guide the material dropping from the large bell to be distributed toward the axis of the furnace.

This apparatus has been widely used in large scale furnaces to reduce the aforementioned problem. However, in existing apparatus, the truck or rod is supported by means of roller bearings which are generally laid on rails and brackets, which are exposed to the atmosphere in the furnace. Thus, various problems arise as to use of such truck or rod. Furthermore, conventional roller bearing apparatus has a disadvantage in that the rod should have a certain length to obtain a predetermined stroke for the distributing plate. Moreover, the structure is complex; additional weight is used; a deck of greater capacity is needed; and a crane is required for checking, repair and transport. Also, added expenses are incurred. Thus, there is room for improvement in the distributing schemes, such as in the construction, conservation of materials, control, etc.

The instant invention has been devised through many investigations of the foregoing problems and priorly used solutions.

An object of the invention is to simplify the structure of a raw material distributing device, and reduce its weight.

Another object is to prevent intrusion of dust particles into the space betwen the armer rod and the bearing, thereby preventing problems caused by such dust particles.

A further object is to increase the stability of conservation and control of maintenance of operation of the furnace.

A still further object is to reduce the cost of production and maintenance.

Briefly, this invention encompasses an apparatus for distributing raw materials which are charged into a furnace. An armer rod is disposed outside the furnace with a distributing plate connected thereto at one end inside the furnace. The armer rod arrangement is provided with a novel sealing mechanism to prevent dust particles from entering between the rod and bearings. Cooling mechanism is provided about the rod arrangement.

Many other prominent characteristics and the actual embodiment will be apparent from the detailed description of preferred embodiments, with reference to the attached drawing.

BRIEF DESCRIPTION OF THE DRAWING

FIG. 2 is an enlarged cross sectional view of the embodiment; and

FIG. 3 is a detailed explanatory view of a dust sealing unit mechanism of the embodiment.

DETAILED DESCRIPTION OF PREFERRED EMBODIMENTS

Figure 1:
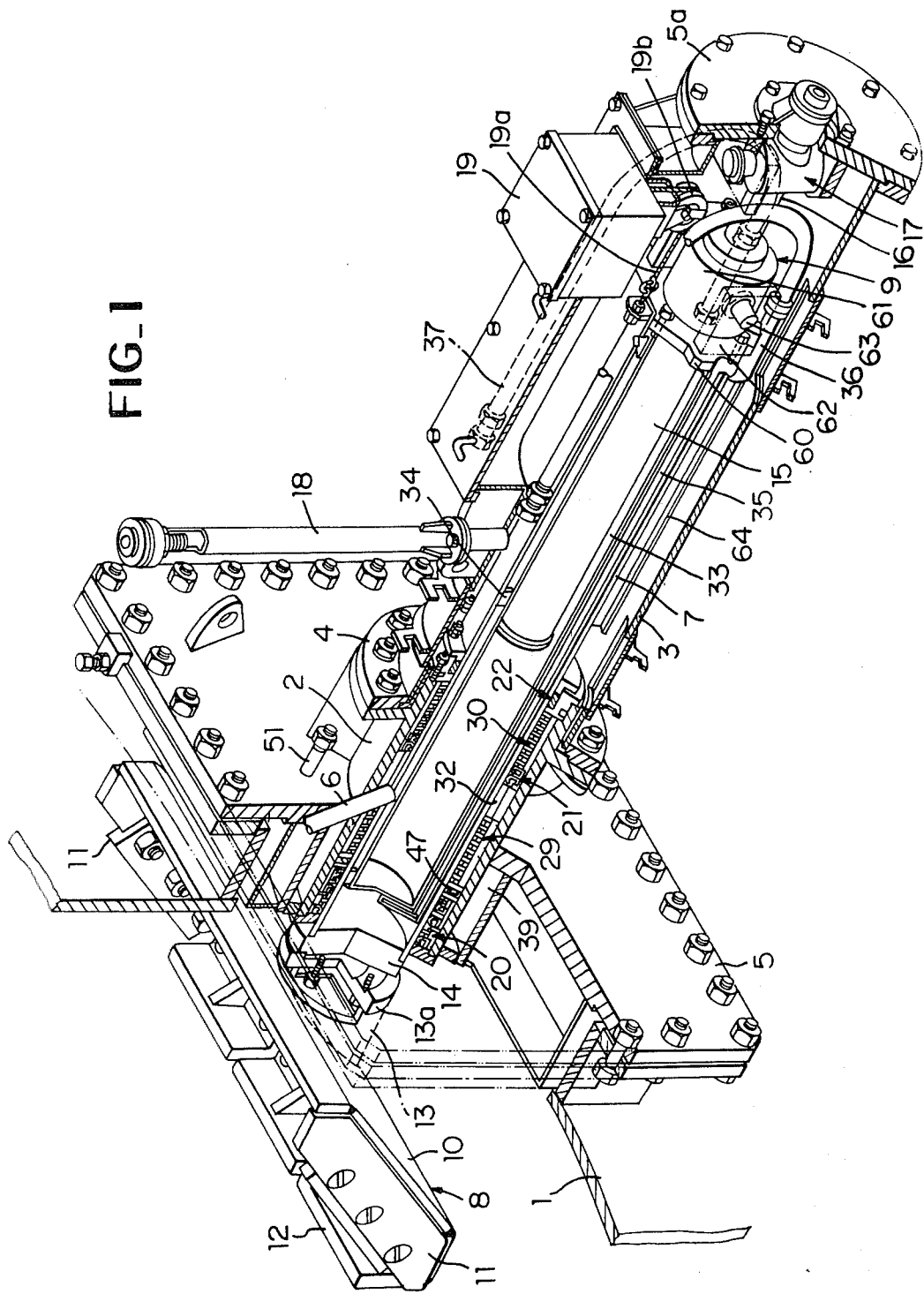
FIG. 1 is a perspective view, partially in section, depicting an illustrative embodiment of the invention.

Turning now to FIG. 1, a shell 1 of a furnace has secured to it with bolts a front casing 2. The front casing 2 is fixed with a rear casing 3 at its flange 4, and concurrently the rear casing 3 is provided with an air absorbing pipe 18, a limit switch box 19, a sealing gas blowing pipe 6 and a dust exhaust port 40 (see FIG. 2).

Within front casing 2 and rear casing 3, there is provided an armer rod 7 slidable toward an axis of the furnace. The armer rod 7 is provided with a distributing plate 8 at its front end and is connected with a cylinder tube 15 and other driving cylinder 9 at its rear. The distributing plate 8, as shown in FIG. 2, comprises an oblique plate 10 and liners 11,12 provided at both sides thereof and a lower side thereof. The oblique plate 10 is secured with a cylindrical supporting shaft 13 at its rear, and a plate 13a at a rear of the supporting shaft 13 and an armer rod head 14 are fixedly secured with bolts.

The driving cylinder 9, as shown in FIG. 1, comprises cylinder tube 15 and a cylinder rod 16. The cylinder tube 15 passes at its rear through a flange 60 and is fixed to a metal part 61. The flange 60 is fixed with a trunion bearing 62 which is provided with a trunion 63 arising from a fixing metal part 61. In this regard, flange 60 is slidably engaged with guide rails 64 and serves to stop rotation of armer rod 7. The rod 16 is connected at its rear with a universal joint mechanism 17 provided to a rear flange 5a of the rear casing 3, thereby to enable the cylinder tube 15 to follow horizontal movement of armer rod 7, and armer rod 7 to follow vertical movement. A wire rope 19a is connected at its end to the rear of armer rod 7 via a pulley 19b for causing the limit switch 19 to work in response to movement of armer rod 7.

Within front casing 2, there are arranged a front bearing 29 and a rear bearing 30 at two positions along the length of armer rod 7. These bearings 29,30, as shown in FIG. 2, secure a bearing case 26 to an inner wall of front casing 2 and secure a bearing material 23, for example, made of hard synthetic resin, to the inner wall of bearing case 26 in such a manner that the bearing material 23 is slidably contacted to armer rod 7. The bearing material 23 may be formed on its inner surface with convexes in zig-zag or checker-like arrangement, or it may be formed in ring or cylindrical shape with sealing gas passages in place. As long as the bearing enables the rod to be slidable, its structure is not especially limited. In this regard, the bearing material 23 may be a synthetic resin or carbon graphite which are excellent in heat resistability, compression strength and low coefficient of friction.

The front bearing 29 is provided at its front side with a front dust sealing unit mechanism 20 which is independent of front casing 2 and ready for following the armer 7 in vertical and horizontal movement directions. The dust sealing unit mechanism 20, as shown in FIG. 3, comprises a unit casing 24, oil seals 41, 42, 43 fixed thereto and seal supports 25, 25a. The unit casing 24 is formed with a sealing gas hole 28 almost midway thereof and is furnished with buffers 70,70a at both ends in the length thereof. The buffer may be made of synthetic resin as is the bearing material 23. The seal supports 25, 25a may be made of hard synthetic resin, and are positioned on an outer periphery of armer rod 7 in place in the length of unit casing 24. The unit casing 24 is fixed at its ends with an oil seal 41, which is of ring shape and may be made of fluorine rubber, at a rear side of which a back-up ring 52 is equipped.

A lip 41a of oil seal 41 is bent towards the furnace, and is pressed at its end by a spring 27 to the outer periphery of armer rod 7. A contacting material 44, which may be made of hard synthetic resin, is positioned on a contacting part of lip 41a contacting to the outer periphery of armer rod 7. An adiabatic material, such as asbestos, is filled within the oil seal.

Between the sealing gas hole 28 and seal supports 25,25a, there are symmetrically arranged oil seals 42, 43 for the front bearing 29 via a back-up ring 53. The lip 42a of oil seal 42 is bent towards the furnace, while the lip 43a of the other oil seal 43 is bent towards the cylinder. With respect to the other parts, they are the same as oil seal 41, but since these oil seals 42,43 are not directly affected with heat or dust particles from the furnace, it is not necessary to have thereat adiabatic material 45.

A spring mechanism 47, such as a conical disc spring, is furnished between dust sealing unit mechanism 20 and front bearing 29 such that it has a buffer effect and follows armer rod 7, even if the dust sealing unit mechanism 20 is pressed by the pressure of the furnace. Sealing gas can pass spring mechanism 47. Sealing gas passage 31 is defined in correspondence parts of the dust sealing unit mechanism and the inner surface of the spring mechanism, as depicted.

As shown in FIG. 2, a spacer 32 is arranged after the front bearing 29 under which a dust exhaust port 40 is formed and above which a sealing gas blowing pipe 6 is provided. Between the spacer 32 and the rear bearing 30, there is arranged a dust sealing mechanism 21 for the rear bearing 30. This dust sealing mechanism 21 comprises an oil seal 48, and 49. The lips of oil seals 48,49 are bent towards the furnace as shown in FIG. 2. With respect to the other parts, they are the same as the oil seal 41, except for the absence of the adiabatic filling material 45. V shaped packings are furnished at the backward side of the rear bearings 30, and synthetic resins are attached to a part of the packing material 22 for contacting the armer rod 7 (not shown).

The armer rod 7 is hollow in the center in which an inner pipe 33 is housed and is supported to the inner surface of armer rod 7 by means of supporting metal parts 34 positioned appropriately. A cooling water conduit 35 is provided at one side along the length of the inner pipe 33 and is connected to a water supply pipe 36 at its rear end, and the armer rod 7 is connected to a water discharge pipe 37 at its rear end.

The front casing 2 is provided with a cooling water box 39 secured to flange 5 on the outer periphery, at the front part thereof. The cooling water box 39 is, as shown in FIG. 2, connected with a supply pipe 50 and a discharge pipe 51, whereby cooling water is circulated within cooling water box 39 to cool the outer periphery at the front part of front casing 2.

Next, reference will be made to the operation of the illustrative embodiment. When sealing gas, such as N₂ gas, purified B gas, and the like, of higher pressure than the pressure within the furnace, is blown from the sealing gas blowing pipe 6 towards the interior of front casing 2, the blown sealing gas flows to the furnace and cylinder 15. The sealing gas, toward the furnace, passes through bearing material 23 of front bearing 29. A part of this gas flows into the interior of oil seal 43 through seal support 25a and urges down the end point of lip 43a to the outer circumference of armer rod 7, the seal support being arranged in spacing peripherily on the armer rod 7. The sealing gas passes through the spring mechanism 47 and flows into hole 28 through passage 31 of front casing 2. A part of this gas flows inwardly of oil seal 42 and, similarly to the above, urges down the end point of lip 42a to the outer circumference of armer rod 7. The sealing gas directed to the furnace, from hole 28 is blown to the rear of lip 41a of oil seal 41 through the set supports, and lip 41a is forced up at its end point due to the pressure of the blown gas, to make a space through which the sealing gas spurts out into the furnace and thus prevents intrusion of dust particles into front casing 2.

On the other hand, sealing gas flowing to the cylinder from pipe 6 urges, as discussed above, the lipe ends of the oil seals 48,49 to the outer circumferences of the armer rod 7, and concurrently is blown to the V shaped packing 22, meandering through the convexed shaped surfaces of bearings of the rear bearing 30. Thus, packing 22 is expanded and is urged at its lower part to the outer circumference of the armer rod 7 to prevent sealing gas from being exhausted outside.

By means of the above mentioned sealing means, the pressure within front casing 2 is always maintained almost equal to the pressure of the inside of the furnace. Thus, those means prevent intrusion of dust particles into the front casing 2 and together with each of the dust sealing mechanisms 20,21 protect the front bearings 29 and rear bearings 30 from dust particles.

The cooling water circulates within armer rod 7. The cooling water supplied from supply pipe 36 is fed to the end of armer rod 7 via conduit 35, and successively returns along the inner wall of the armer rod 7 outside from the discharge pipe 37. The outer circumference at the front of the front casing 2 is cooled by water cooling box 39, whereby the front bearing 29 and the dust sealing unit mechanism 20 are cooled inwardly and outwardly of the front casing 2, and the rear bearing 30 and the dust sealing mechanism 21 are cooled inwardly of the front casing 2. By means of this cooling mechanism, the bearings and dust sealing mechanism are protected from the heat of the furnace, thereby prolonging the life thereof.

From the above discussion, it can be appreciated that the effect brought about by the present invention is substantial. According to the present invention, the armer rod has a slidable bearing made of hard synthetic resin, whereby there is very little wear and tear on the armer rod, and thus intrusion of dust particles is more easily avoided. Thus, accordingly, also the driving mechanism is plaqued with fewer problems. Also, advantageously, it is possible to shorten the length of the armer rod in comparison with the existing arrangements, so that rails and brackets to support such prior arangements are no longer required. Further, the accompanying facilities may be reduced in size or completely eliminated by using the instant invention. Moreover, the structure is considerably simplified and can be economically produced. The dust sealing mechanism provided at the end of the armer rod also comprises synthetic resin and is ready for following the armer rod in vertical and horizontal movement directions to provide highly stable dust seals.

The foregoing description is illustrative of the principles of the invention. Numerous variations and extension thereof would be apparent to the worker skilled in the art. All such variations and extension are to be considered to be within the spirit and scope of the invention.

What is claimed is:

1. A raw material distributing apparatus for a furnace, comprising
    an armer rod slidable with respect to said furnace;
    a distributing plate for charged raw material secured at a front end of said rod;
    a casing for holding said rod;
    a sliding bearing comprising hard synthetic resin arranged on an inner wall of said casing between said casing and said rod;
    a non-metallic dust sealing mechanism disposed toward an end of said sliding bearing;
    means for supplying sealing gas to said dust sealing mechanism; and
    cooling means having part hereof disposed within said rod and toward a front end of said casing, to cool the interior of said rod, and an outer circumference of said front of said casing;
wherein said sealing mechanism comprises a unit casing, a first oil seal, a second oil seal, a set of supports, said unit casing being independent of said casing holding said rod, said first oil seal being secured to said unit casing and contacting its lip end to the outer periphery of said rod, said second oil seal being secured at the front end directed toward the furnace of said unit casing and being packed with adiabatic material for spouting out the sealing gas from the lip pointed into said furnace, and said supports being of hard synthetic resin and secured to said unit casing.

2. The apparatus of claim 1, wherein said sealing mechanism is disposed at end points of said sliding bearing and wherein said sealing mechanism is divided into the front and rear sides in the length of said casing.

3. The apparatus of claim 1, wherein said sealing mechanism follows the movement of said rod.

4. The apparatus of claim 1, wherein a hole is formed in said unit casing to provide a passage for the sealing gas at a corresponding part of said sealing mechanism.

5. The apparatus of claim 1, wherein a spring mechanism is provided between said sliding bearing and said sealing mechanism.

6. The apparatus of claim 4, wherein bearing materials are arranged at the rear of said sliding bearing provided at the back side of said casing holding said rod.

7. The apparatus of claim 1, wherein said cooling mechanism comprises an inner pipe disposed within said rod, a cylinder disposed within said inner pipe for moving said rod, a cooling water conduit in the length of one side of said inner pipe, a water supply pipe connected to said conduit, and a discharge pipe connected to the rear of said inner pipe.

8. The apparatus of claim 1, wherein said cooling mechanism comprises a cooling water box secured on the outer circumference at the fron of said casing, and a water supply pipe and water discharge pipe connected to said cooling water box.

* * * * *